United States Patent
Sheng et al.

(10) Patent No.: US 7,457,138 B2
(45) Date of Patent: Nov. 25, 2008

(54) SINGLE PIN MULTI-FUNCTION SIGNAL DETECTION METHOD AND STRUCTURE THEREFOR

(75) Inventors: Senpeng Sheng, Chandler, AZ (US); Juan Carlos Pastrana, Chandler, AZ (US)

(73) Assignee: Semiconductor Components Industries L.L.C., Phoenix, AZ (US)

( * ) Notice: Subject to any disclaimer, the term of this patent is extended or adjusted under 35 U.S.C. 154(b) by 210 days.

(21) Appl. No.: 11/181,332

(22) Filed: Jul. 14, 2005

(65) Prior Publication Data

US 2007/0014063 A1   Jan. 18, 2007

(51) Int. Cl.
*H02M 3/335* (2006.01)
*H02M 3/315* (2006.01)

(52) U.S. Cl. ............... 363/21.12; 363/21.17; 363/21.18

(58) Field of Classification Search ............... 363/21.12, 363/21.15, 21.17, 21.18
See application file for complete search history.

(56) References Cited

U.S. PATENT DOCUMENTS

| | | | | |
|---|---|---|---|---|
| 5,856,917 A | * | 1/1999 | Aonuma et al. | 363/21.04 |
| 5,859,768 A | | 1/1999 | Hall et al. | |
| 5,892,355 A | | 4/1999 | Pansier et al. | |
| 5,991,172 A | * | 11/1999 | Jovanovic et al. | 363/21.14 |
| 6,088,243 A | | 7/2000 | Shin | 363/21.05 |
| 6,385,061 B1 | * | 5/2002 | Turchi et al. | 363/21.15 |
| 6,445,598 B1 | * | 9/2002 | Yamada | 363/21.12 |
| 6,597,221 B2 | | 7/2003 | Hall et al. | |
| 6,914,789 B2 | * | 7/2005 | Kinoshita et al. | 363/21.12 |
| 6,944,034 B1 | * | 9/2005 | Shteynberg et al. | 363/21.13 |
| 6,972,969 B1 | * | 12/2005 | Shteynberg et al. | 363/21.12 |
| 7,064,968 B2 | * | 6/2006 | Choi et al. | 363/97 |
| 2003/0202364 A1 | * | 10/2003 | Lomax et al. | 363/21.09 |
| 2005/0248965 A1 | * | 11/2005 | Yamada et al. | 363/21.08 |

\* cited by examiner

*Primary Examiner*—Bao Q Vu
(74) *Attorney, Agent, or Firm*—Robert F. Hightower

(57) ABSTRACT

In one embodiment, a multi-function signal sensor is configured to receive a signal having a plurality of states and to offset the input signal by a first amount for values of the input signal that are greater than a first value.

20 Claims, 3 Drawing Sheets

US 7,457,138 B2

SINGLE PIN MULTI-FUNCTION SIGNAL DETECTION METHOD AND STRUCTURE THEREFOR

BACKGROUND OF THE INVENTION

The present invention relates, in general, to electronics, and more particularly, to methods of forming semiconductor devices and structure.

In the past, the number of pins or terminals of a semiconductor package that were available often formed one restriction or design parameter in designing the integrated circuit. The ability to combine more than one function on a single terminal was advantageous in efficiently utilizing the number of package terminals that were available. Examples of circuits that utilize one terminal for more than one function are disclosed in U.S. Pat. No. 5,859,768 issued to Jefferson Hall et al on Jan. 12, 1999 which is hereby incorporated herein by reference and also in U.S. Pat. No. 5,892,355 issued to Frans Pansier et al on Apr. 6, 1999.

In some applications, the value of the signal that represented more than one function or more than one functional state could exceed the maximum signal values that were usable by the integrated circuit. Applying such signal values could result in damaging the integrated circuit.

Accordingly, it is desirable to have a circuit and method of determining multiple functional states of a signal that do not result in damage to the circuit that receives the signal.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
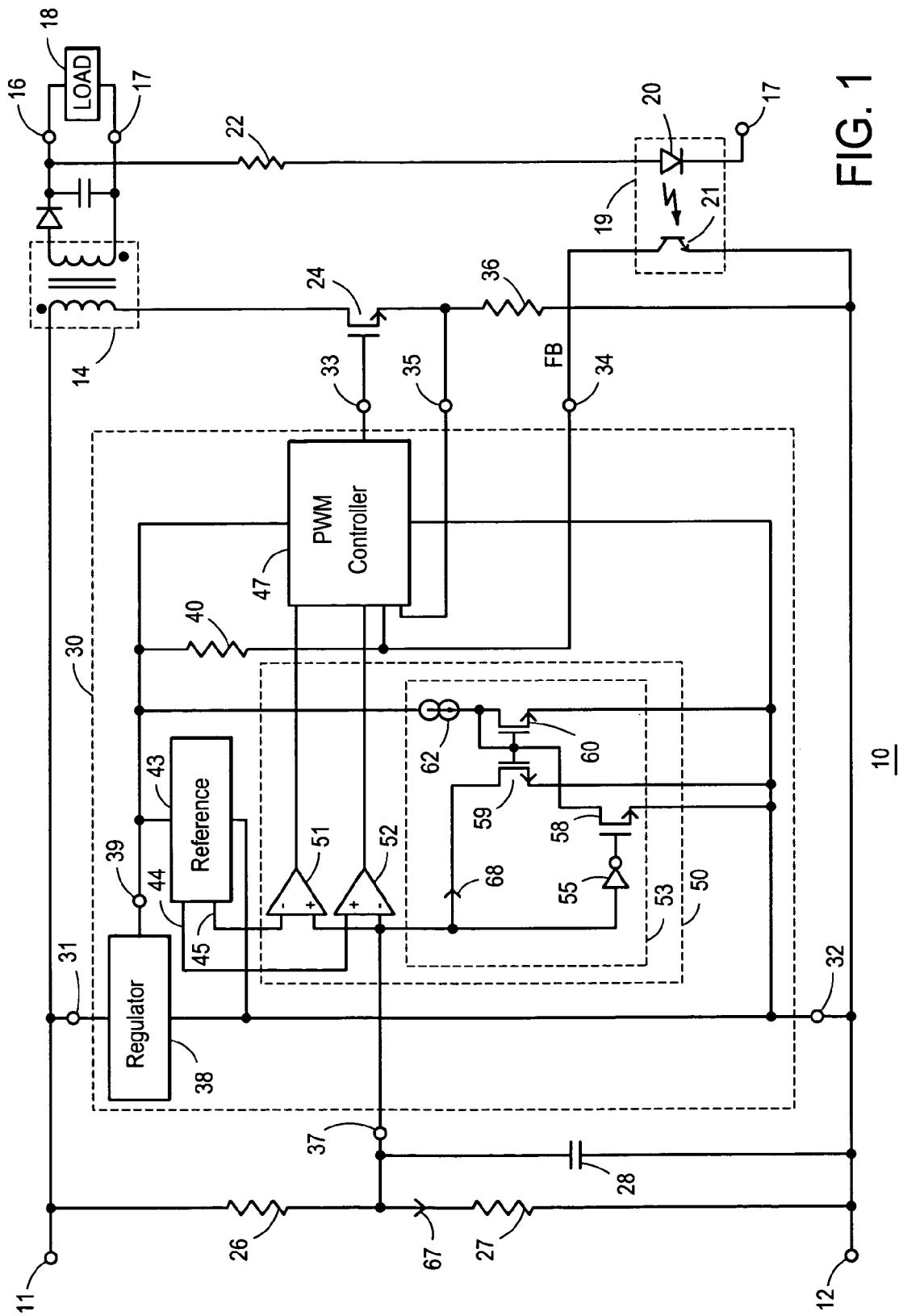
FIG. 1 schematically illustrates an embodiment of a portion of an exemplary form of a power supply controller that receives a signal having multiple functional states in accordance with the present invention.

FIG. 1 schematically illustrates an embodiment of a portion of a power supply system 10 that has an exemplary form of a power supply controller 30 that receives a signal having multiple signal levels representing multiple functional states.

Power supply system 10 typically receives power from a bulk voltage between a power input terminal 11 and a power return terminal 12 and forms an output voltage between an output 16 and return 17. A load 18 may be connected to receive the output voltage and a load current from output 16 and return 17. The bulk voltage applied between terminals 11 and 12 may be a dc voltage or a rectified ac voltage such as a half-wave rectified sine-wave. System 10 typically includes an inductor such as a transformer 14 that is controlled by a power switch, such as a power transistor 24, to form the output voltage. System 10 also generally includes a feedback network, illustrated by an optical coupler 19 and a resistor 22, that is utilized provide a feedback (FB) signal that is representative of the value of the output voltage between output 16 and return 17. Optical coupler 19 includes an optical emitter 20 and a phototransistor 21. A pull-up resistor 40 within controller 30 may be used to pull-up the output of coupler 19 to assist in forming the FB signal. Such feedback (FB) networks and feedback (FB) signals are well known to those skilled in the art. A current sense resistor may be used to form a current sense signal that is representative of the value of the current flowing through transistor 24. In some embodiments, transistor 24 may be included as a part of controller 30.

The exemplary form of controller 47 illustrated in FIG. 1 usually receives one of or both of the current sense signal on a current sense input 35 and the FB signal on a FB input 34 and responsively forms a switching control signal on output 33. The switching control signal is utilized to control transistor 24 and regulate the value of the output voltage between output 16 and return 17. Controller 30 generally receives power from the bulk voltage between a voltage input 31 and a voltage return 32. Input 31 generally is connected to terminal 11 and return 32 typically is connected to terminal 12. Controller 30 usually includes a PWM controller 47, an internal regulator 38, a reference signal generator or reference 43, and a multilevel signal sensor 50. Multilevel sensor 50 is configured to receive an input signal on an input 37 that has multiple signal levels or values that represent different functional states of the input signal. Internal regulator 38 generally is utilized to form an internal operating voltage on an output 39 that is used for operating some of the elements of controller 30 such as PWM controller 47 and reference 43. Reference 43 forms reference signals that are used for operating portions of controller 30 including sensor 50. Reference 43 generates a first reference signal or under-voltage reference signal on an output 44 and generates a second reference signal or over-voltage reference signal on an output 45. PWM controller 47 can be configured as any of a variety of PWM controller functions such as a voltage mode PWM controller, a current mode PWM controller, a leading edge or trailing edge PWM controller, or a hysteretic controller. Such PWM controller functions are well-known to those skilled in the art. One example of a suitable PWM controller is disclosed in U.S. Pat. No. 6,597,221 issued to Jefferson Hall et al on Jul. 22, 2003 which is hereby incorporated herein by reference.

During operation it is possible that the value of the bulk voltage may be less than a value that is generally regarded as an under-voltage state or the bulk voltage may be greater than a value that is generally regarded as an over-voltage state. The input signal on input 37 is formed to be representative of the bulk voltage and has one value that is representative of an under-voltage state of the bulk voltage and another value that is representative of an over-voltage state of the bulk voltage. A resistor divider that includes resistors 26 and 27 together in series is connected between terminals 11 and 12 forms the input signal that is representative of the value of the bulk voltage at a common connection between resistors 26 and 27. The common connection is also connected to input 37. The bulk voltage dropped across resistors 26 and 27 forms a current 67 that flows through resistors 26 and 27. As is well known in the art, a capacitor 28 may be used to prevent the value of the input signal from drooping when controller 30 begins operating.

In the preferred embodiment, sensor 50 is configured to receive the input signal and detect the values of the input signal that are representative of the under-voltage value and over-voltage values of the bulk voltage. This preferred embodiment of sensor 50 includes a first comparator or over-voltage comparator 51, a second comparator or under-voltage comparator 52, and an offset circuit 53. The preferred embodiment of offset circuit 53 includes a first transistor 58, a second transistor 59, a third transistor 60, a fixed current source 62, and an inverter 55. Sensor 50 is also configured to detect the input signal having a value that is no less than a first value, and to offset the value of the input signal by at least a first amount responsively to values of the input signal that are no less than the first value. Offsetting the value of the input signal facilitates sensor 50 detecting representative over-voltage values of the input signal that may be greater than values that may damage controller 30. As will be seen further hereinafter, the preferred embodiment of sensor 50 offsets the value of the input signal by forming a current 68 that flows through resistor 26.

Figure 2:
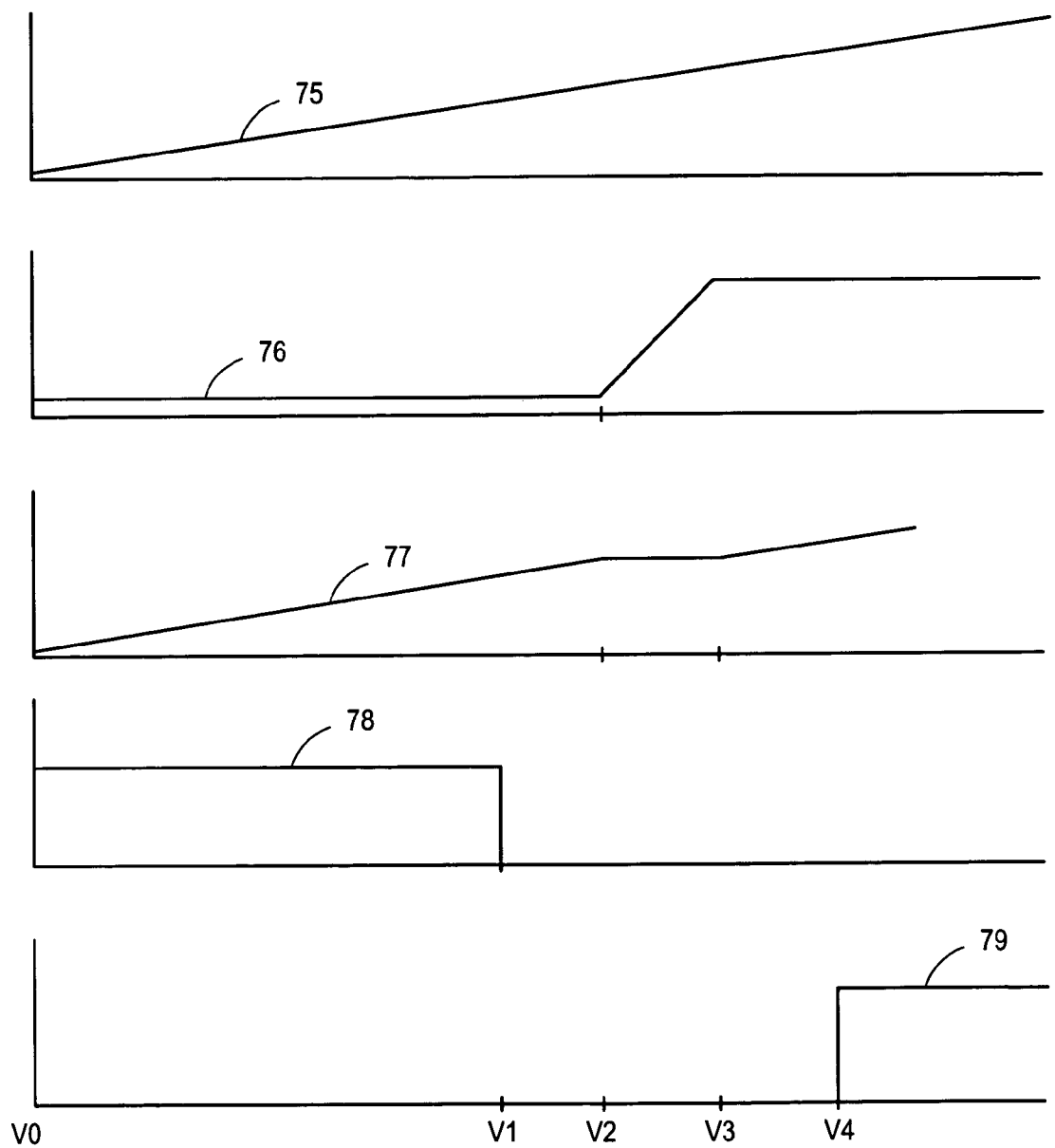
FIG. 2 is a graph having plots of some signals of the power supply controller of FIG. 1 in accordance with the present invention.

FIG. 2 is a graph having plots that graphically illustrate some of the operational signals of controller 30. The abscissa indicates increasing value of the bulk voltage and the ordinate indicates increasing values of the illustrated signals. A plot 75 illustrates the peak value of the bulk voltage. A plot 76 illustrates the value of current 68. A plot 77 illustrates the input signal on input 37. A plot 78 illustrates the output of under-voltage comparator 52, and a plot 79 illustrates the output of over-voltage comparator 51. The points V1, V2, V3, and V4 on the graph refer to values of the bulk voltage between terminals 11 and 12.

Comparator 52 is configured to detect the input signal having a value that is representative of the bulk voltage having a value no greater than the under-voltage value and comparator 51 is configured to detect the input signal having a value that is representative of the bulk voltage having a value no less than the over-voltage value. Comparator 52 compares the input signal to the value of the under-voltage reference signal on output 44 of reference 43 and forms the output of comparator 52 responsively to the value of the input signal. If the bulk voltage is less than the under-voltage value as illustrated by plot 75 between values V0 and V1, the value of the input signal is less than the under-voltage reference signal and the output of comparator 52 is high as illustrated by plot 78. These values of the input signal are less than a low input threshold value of inverter 55, thus, the output of inverter 55 is high. The high from inverter 55 enables transistor 58 to pull the gates of transistors 59 and 60 low thereby disabling transistors 59 and 60. Thus, sensor 50 has no effect on the operation of controller 30 or on the input signal for values of the input signal that are less than the low input threshold value of inverter 55.

For values of the input signal that are no less than the first value wherein the first value is greater than the representative under-voltage value, sensor 50 offsets the value of the input signal and reduces the maximum value of the input signal. As the value of the bulk voltage increases past the under-voltage value at V1, the input signal responsively increases as illustrated by plot 77 after value V1. As the input signal increases to the first value at a point V2 that is no less than the low input threshold value of inverter 55, the output of inverter 55 begins transitioning to a low state. As is well known to those skilled in the art, an inverter has an input transition region that extends from the low input threshold value to a high input threshold value of the inverter. At signal levels below the low input threshold value, the output of the inverter is high and at signal levels above the high input threshold value, the output of the inverter is low. As the input signal to the inverter moves from the low input threshold value toward the high input threshold value, the output of the inverter is also in an output transition region varying from the high output value to the low output value and vice versa. This is generally regarded as the transition region of the inverter. As the input voltage to inverter 55 moves through the input transition region, the output of inverter 55 moves through the output transition region. As a result of the inverter output moving through the output transition region, the voltage applied to the gate of transistor 58 decreases as the value of the input signal on input 37 increases thereby operating transistor 58 in the linear region or triode mode region wherein the value of the source-to-drain voltage varies as the gate-to-source voltage varies. Consequently, as the value of the output of inverter 55 moves through the output transition region, the value of the voltage applied to the gates of transistors 59 and 60 also decreases and transistors 59 and 60 also operate in the linear or triode mode region. As transistors 59 and 60 become conductive, a portion of the current from source 62 is mirrored to flow through transistor 59 as current 68. As transistors 59 and 60 become more conductive, a larger portion of the current from source 62 is mirrored to current 68. Thus, the value of current 68 gradually increases as the value of the input signal applied to the input of inverter 55 increases from the first value or low input threshold value at point V2 to the second value or upper input threshold value at point V3. The size of the upper and lower transistors in the input stage of inverter 55 are selected to establish the lower and upper input threshold values of inverter 55 and to provide a low gain that allows the output to have a low slew rate. The low slew rate assists in reducing oscillations in the input signal as the output of inverter 55 moves through the output transition region. The lower input threshold value is formed to be greater than the value of the under-voltage reference signal on output 44 of reference 43 and the upper threshold value is formed to be less than the over-voltage reference signal on output 45 of reference 43. As can be seen, the functionality of inverter 55 selectively couples an offset signal, for example current 68, to the input signal responsively to the first value of the input signal.

The value of current 68 is subtracted from the current flowing through resistor 26 leaving current 67 to flow through resistor 27. Thus, current 68 offsets the value of the voltage dropped across resistor 27 by reducing the value of current 67 flowing through resistor 27. Coupling current 68 to flow through resistor 26 offsets the increase in the input signal that results from the increase in the bulk voltage, thus, offsetting the value of the input signal as given by:

$$V37 = VB - ((I67 + I68) * R26)$$

where

V37=the value of the input signal,

VB=the value of the bulk voltage, and

R26=the value of resistor 26.

After the input signal is greater than the second value or the upper input threshold value of inverter 55 as illustrated by plot 77 at point V3, transistors 59 and 60 are completely enabled and the current from source 62 is mirrored to current 68. As can be seen, as long as the input signal is greater than the first value or low input threshold value, current 68 begins to flow and offset the input signal by at least some amount. As the input signal reaches the second value or upper input threshold value, current 68 reaches the maximum value and the amount of the offset becomes a fixed value for further increases in the input signal. Also, for values of the input signal between the first and second values, the rate of change of the input signal relative to the rate of change of the bulk voltage is reduced because the value of current 68 is increasing. Thus, in addition to offsetting the value of the input signal, this decrease in the rate of increase of the input signal relative to increases in the bulk voltage causes the input signal to increase at a slower rate than without current 68. After the input signal is no less than the second value, current 68 functions to offset the value of the input signal but no longer affects the rate of change. Consequently, sensor 50 offsets the input signal by a variable amount for value of the input signal between the first and second value and offsets the input signal by a fixed amount for value of the input signal that are greater than the second value. As can be seen by plots 75 and 77, as the value of the bulk voltage continues to increase, the value of the input signal is offset by a fixed amount and eventually increases to maximum value that is less than the maximum value that it would have without the functionality of sensor 50.

As is well known in the art, the sizes of transistors 59 and 60 may be selected to ratio the amount of current from source 62 that is use to form current 68. Additionally, it can be seen that the value of the bulk voltage that is represented by the first value of the input signal can be selected by proper choice of the value of resistor 26. In some embodiments, resistor 27 may be a portion of controller 30.

Comparator 51 compares the input signal to the second reference signal from output 45 of reference 43 and forms the output of comparator 51 responsively to the input signal. If the value of the bulk voltage is no less than the over-voltage value as illustrated at points V4 and greater, the value of the input signal is no less than the second reference signal on output 45 of reference 43 and the output of comparator 51 is forced high as illustrated by plot 79. Those skilled in the art will appreciate that the adjustment to the input signal provided by sensor 50 facilitates setting the over-voltage value and the under-voltage values independently. Because current 68 flows through resistor 26 but not resistor 27, the over-voltage value can be selected by selecting the absolute value of resistor 26 and the under-voltage value can be selected by selecting the ratio between resistors 26 and 27 as given by the equations:

$$V4=((V44/V45)*V1)+I68*R26$$

$$V1=((R26+R27)/R27)*V45)$$

where:

V1=the under-voltage value of the bulk voltage,

V4=the over-voltage value of the bulk voltage,

V44=the value the under-voltage reference signal on output 44 of reference 43,

V45=the value the over-voltage reference signal on output 45 of reference 43,

R26=the value of resistor 26,

R27=the value of resistor 27, and

I68=the value of current 68,

PWM controller 47 receives the output of comparators 51 and 52 and sets the under-voltage and over-voltage operating states of controller 30 responsively to comparators 51 and 52. For values of the bulk voltage that form low values for the outputs of comparator 51 and 52, PWM controller 47 usually operates to regulate the value of the output voltage between output 16 and return 17 as is well known by those skilled in the art.

In one example embodiment, current source 62 was formed to provide fifty (50) micro-amps of current and the ratio of transistor 59 to transistor 60 was 2:5 so that the maximum value of current 68 was twenty (20) micro-amps. The value of the first reference signal on output 44 of reference 43 was about two volts (2 V) and the value of the second reference signal on output 45 was about three volts (3 V). The low input threshold of inverter 55 was approximately 2.5 volts and the upper input threshold was about 2.6 volts.

In order to implement this functionality for controller 30, regulator 38 is connected between input 31 and return 32. Output 39 of regulator 38 is connected to a power input of reference 43 which is a power return connected to return 32. Output 44 of reference 43 is connected to a non-inverting input of comparator 52 and output 45 of reference 43 is connected to an inverting input of comparator 51. A non-inverting input of comparator 51 is commonly connected to an inverting input of comparator 52, input 37, the input of inverter 55, and a drain of transistor 59. The output of comparator 51 is connected to a first input of controller 47 and the output of comparator 52 is connected to a second input of controller 47. The output of controller 47 is connected to output 33. The output of inverter 55 is connected to a gate of transistor 58. The source of transistor 58 is commonly connected to return 32 and a source of transistors 59 and 60. A drain of transistor 58 is commonly connected to a gate of transistors 59 and 60, a drain of transistor 62, and a first terminal of source 62. The second terminal of source 62 is connected to output 39.

Figure 3:
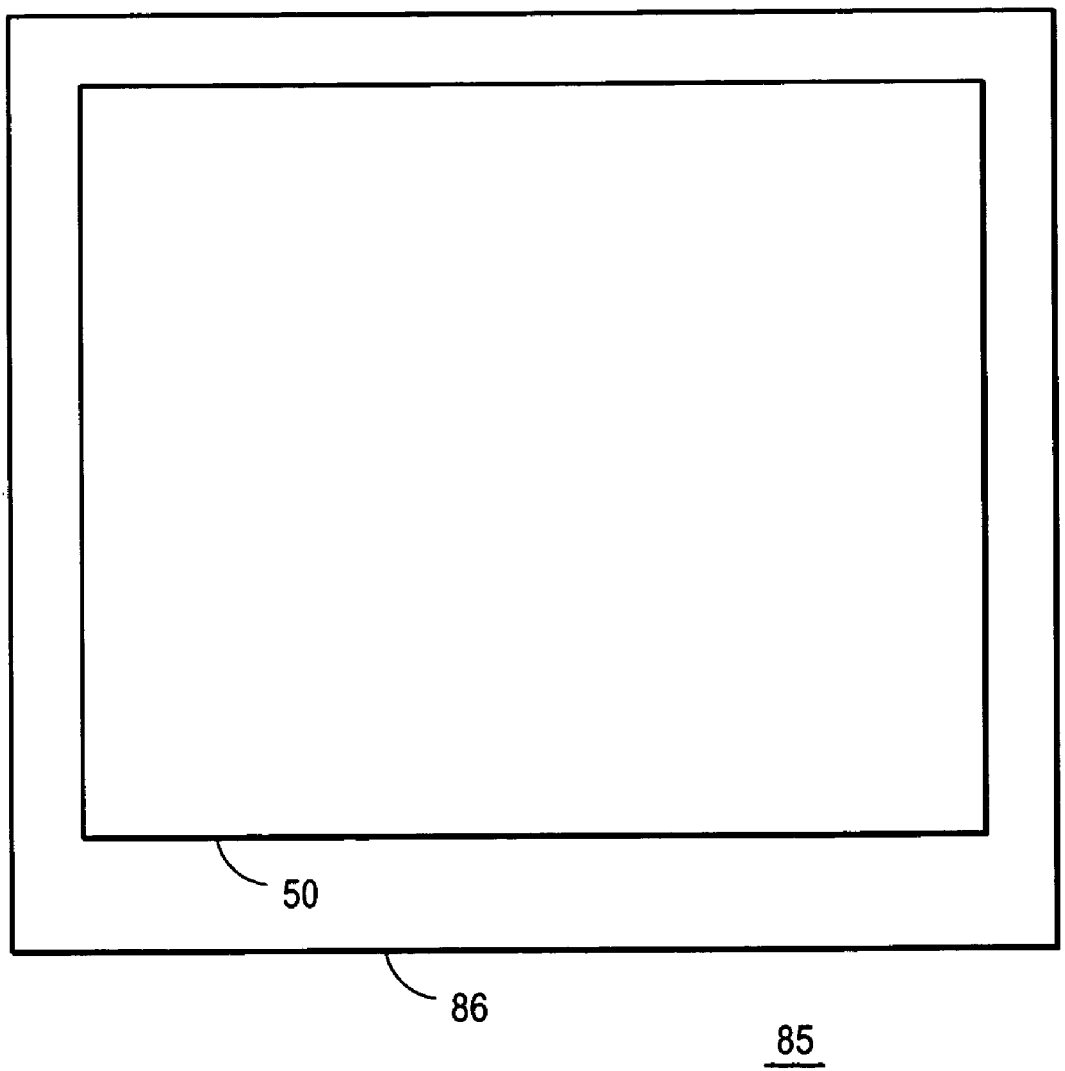
FIG. 3 schematically illustrates an enlarged plan view of a semiconductor device that includes the power system of FIG. 1 in accordance with the present invention.

FIG. 3 schematically illustrates an enlarged plan view of a portion of an embodiment of a semiconductor device 85 that is formed on a semiconductor die 86. Sensor 50 is formed on die 86. Die 86 may also include controller 30 and other circuits that are not shown in FIG. 3 for simplicity of the drawing. Sensor 50 and device 85 are formed on die 86 by semiconductor manufacturing techniques that are well known to those skilled in the art. Die 86 generally is assembled in a semiconductor package (not shown). Using one input terminal to sense or detect a plurality of states of the input signal provides efficient utilization of the terminals of the semiconductor package.

In view of all of the above, it is evident that a novel device and method is disclosed. Included, among other features, is forming sensor that can detect values of a single input signal that represent multiple functional states of a system. Configuring the sensor to offset the value of the input signal for values greater than a first value facilitates using the sensor for signal values that may exceed the maximum voltage rating of the sensor.

While the invention is described with specific preferred embodiments, it is evident that many alternatives and variations will be apparent to those skilled in the semiconductor arts. The exemplary embodiment illustrated in FIG. 1 receives an input signal having two levels representative of two functional states, although sensor 50 may also be expanded to detect more that two levels or states, for example, by using another current source such as source 62 that adds a current at a different value of the input signal, and another comparator to detect the value. Sensor 50 may be configured with various other embodiments in addition to the preferred embodiment illustrated in FIG. 1 as long as the value of the input signal is offset by at least a first amount for values of the input signal that are no less than the first value. For example, inverter 55 may be replaced by an operational amplifier. Also, circuit 53 may be replaced by various other implementations as long as the implementation detects the first value and forms a signal to offset the input signal. For example, circuit 53 may be replaced by a hysteresis comparator and a third reference signal that couples an offsetting voltage source to input 37. As will be appreciated by those skilled in the art, the exemplary form of system 10 and controller 30 are used as a vehicle to explain the operation method of detecting multiple levels and to explain the preferred embodiment of sensor 50. Sensor 50 does not have to be a portion of a power supply controller such as controller 30 but may be used in other applications that require sensing multiple levels of a signal on one terminal. Although controller 30 is illustrated in a flyback power supply system application, controller 30 may be used in various other well known types of power supply systems. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A multi-level signal sensor comprising:
an input coupled to receive an input signal having a plurality of signal levels; and
a sensor coupled to receive the input signal and not offset the input signal for values of the input signal that are less than a first value, the sensor coupled to detect the input signal having a value that is no less than the first value and to responsively apply an offset signal to the input and to sum the offset signal with the input signal and change the value of the input signal for values of the input signal that are no less than the first value.

2. The signal sensor of claim 1 wherein the sensor is coupled to detect the input signal having a second value that is less than the first value and to detect the input signal having a third value that is greater than the first value.

3. The signal sensor of claim 2 wherein the the third value is adjustable independently of the second value.

4. The signal sensor of claim 3 wherein the third value is adjustable by changing values of resistors of a resistor divider and by changing a ratio of the resistors of the resister divider.

5. The signal sensor of claim 2 wherein the sensor includes a first comparator coupled to detect the second value and a second comparator coupled to detect the third value.

6. The signal sensor of claim 2 wherein the sensor is a portion of a power supply controller and the second value is representative of an under-voltage condition of an input voltage to the power supply controller and the third value is representative of an over-voltage condition of the input voltage.

7. The signal sensor of claim 1 wherein the sensor includes an inverter operably coupled to receive the input signal and couple a current to the input signal and also includes a first transistor coupled to receive an output signal from the inverter and control a second transistor to couple the current to the input signal.

8. A method of forming a multiple level sensor comprising:
configuring the multiple level sensor to receive a signal having multiple levels wherein the signal is received on an input of the sensor; and
configuring the multiple level sensor to apply an offset signal to the input to change values of the signal by a first amount for values of the signal that are no less than a first value of the signal.

9. The method of claim 8 wherein configuring the multiple level sensor to apply an offset signal to the input to change values of the signal by the first amount for values of the signal that are no less than the first value of the signal includes configuring the multiple level sensor to offset values of the signal by a variable amount for values of the signal that are between the first value of the signal and a second value of the signal wherein the second value is less than the first value.

10. The method of claim 8 wherein configuring the multiple level sensor to apply an offset signal to the input to change values of the signal by the first amount for values of the signal that are no less than the first value of the signal includes configuring the multiple level sensor to offset values of the signal by a fixed amount for values of the signal that are no less than the first value of the signal.

11. The method of claim 8 wherein configuring the multiple level sensor to receive the signal having multiple levels includes configuring the multiple level sensor to receive the signal from one terminal of an integrated circuit.

12. The method of claim 8 wherein configuring the multiple level sensor to apply an offset signal to the input to change values of the signal by the first amount for values of the signal that are no less than the first value of the signal includes configuring the multiple level sensor to form an offset current to offset values of the signal.

13. The method of claim 8 wherein configuring the multiple level sensor to apply an offset signal to the input to change values of the signal by the first amount for values of the signal that are no less than the first value of the signal includes configuring the multiple level sensor to form a first current and couple a second current representative of the first current to the signal responsively to the first value of the signal.

14. The method of claim 8 wherein configuring the multiple level sensor to apply an offset signal to the input to change values of the signal by the first amount for values of the signal that are no less than the first value of the signal includes coupling a first comparator to detect a second value of the signal that is less than the first value of the signal and a second comparator to detect a third value of the signal that is greater than the first value of the signal.

15. The method of claim 8 wherein configuring the multiple level sensor to receive the signal having multiple levels includes configuring the multiple level sensor as a portion of a switching power supply controller.

16. The method of claim 9 wherein configuring the multiple level sensor to receive the signal having multiple levels includes configuring the multiple level sensor to receive the signal having levels representative of a power under-voltage condition and a power over-voltage condition.

17. A power supply control method comprising:
forming an input signal having a first value representative of a first operating state of a power supply controller and a second value that is representative of a second state of the power supply controller; and
applying an offset signal to the input signal for values of the input signal that are greater than a third value wherein the third value is greater than the first value and less than the second value and not applying the offset signal for values of the input signal that are no greater than the first value.

18. The method of claim 17 wherein applying an offset signal to the input signal for values of the input signal that are greater than the third value includes coupling a current to the input signal to form a voltage that offsets the input signal.

19. The method of claim 17 wherein applying an offset signal to the input signal for values of the input signal that are greater than the third value includes using an inverter to detect the third value and using the inverter to selectively couple an offset signal to the input signal.

20. The method of claim 17 further including using the first value and the second value of the input signal to set first and second an operating states of a power supply controller.

* * * * *